Figure 1:
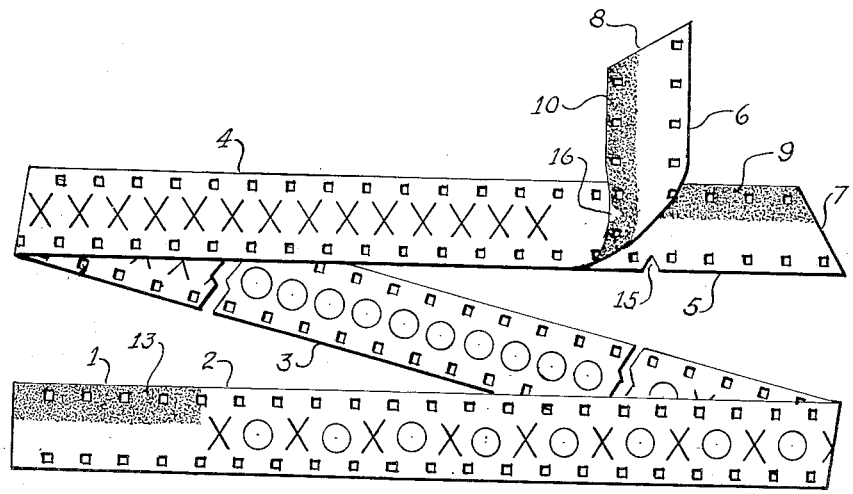

Dec. 25, 1951   H. R. HUSTAD   2,579,581
LEADER FILM

Filed Dec. 26, 1947   2 SHEETS—SHEET 1

INVENTOR.
Hugo R. Hustad

Dec. 25, 1951  H. R. HUSTAD  2,579,581
LEADER FILM

Filed Dec. 26, 1947  2 SHEETS—SHEET 2

INVENTOR.
Hugo R. Hustad

Patented Dec. 25, 1951

2,579,581

UNITED STATES PATENT OFFICE 2,579,581

LEADER FILM

Hugo R. Hustad, Detroit, Mich.

Application December 26, 1947, Serial No. 794,042

2 Claims. (Cl. 88—19.5)

My invention relates to motion picture film and particularly to leader film to be used with motion picture projectors, the general object of the invention being to provide a strong but temporary union of the closing end of a projected movie film with the beginning end of a movie film about to be projected so that the united ends can be run through the projector together before the temporarily united ends are disunited, and thus the movie film to be projected is automatically threaded into the projector.

An important object of the invention is to provide protection of film surfaces treated with pressure sensitive adhesive used to bind the temporary union of movies film ends. This protection is to prevent the contact of pressure sensitive adhesive surfaces with foreign objects when these surfaces are not being used for their specifically designed purposes, and to prevent contact of each with another pressure sensitive adhesive surface during all phases of operation, such contacts being damaging to pressure sensitive adhesive surfaces.

A further object of the invention is to provide indicators to facilitate the easy alignment of sprocket holes when the leader film is to be temporarily joined with another film strip.

A further object of the invention is to provide places on the structure to be used for making easy the separation of surfaces held together by the pressure sensitive adhesive.

A further object of the invention is to provide signals for indicating when the projector should be stopped for temporarily uniting the end of two movie films, so that the beginning end of the movie film to be projected will follow through the projector with the closing end of the film already projected. Also, to provide a signal for indicating that the film to be projected is threaded into the projector and is ready for disuniting from the projected film.

A further object of the invention is to provide a strip of film which can be left threaded in the projector while the projector is in non-use, this strip of film to be used for automatically threading into the projector the next movie film to be projected.

A further object of the invention is to provide a leader film to be cemented to the beginning end of a movie film, the beginning end of the leader film to be treated with pressure sensitive adhesive which will cause that end to make temporary union with a surface, either for holding that end in place on a completely wound movie film, or for holding that end in place at the hub of a reel in preparation for winding the movie film during projection.

Figure 2:
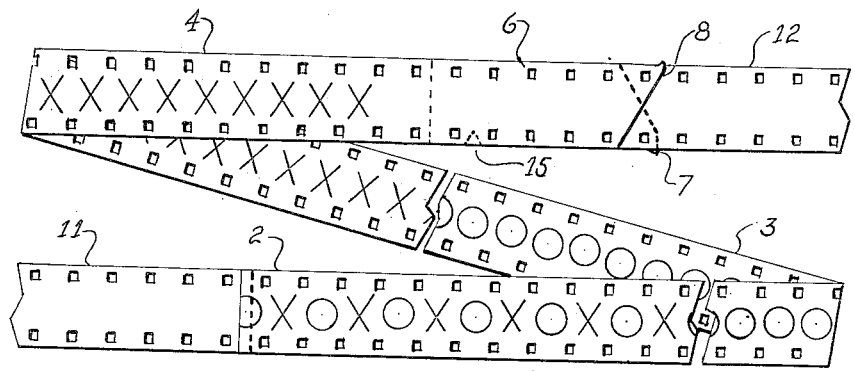
Figure 3:
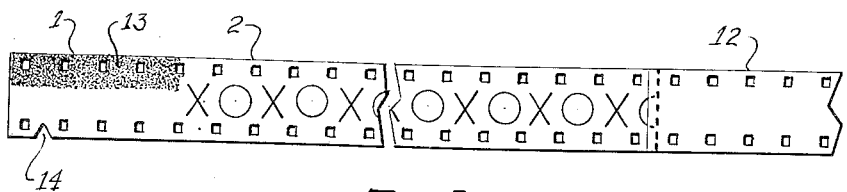
Figure 4:
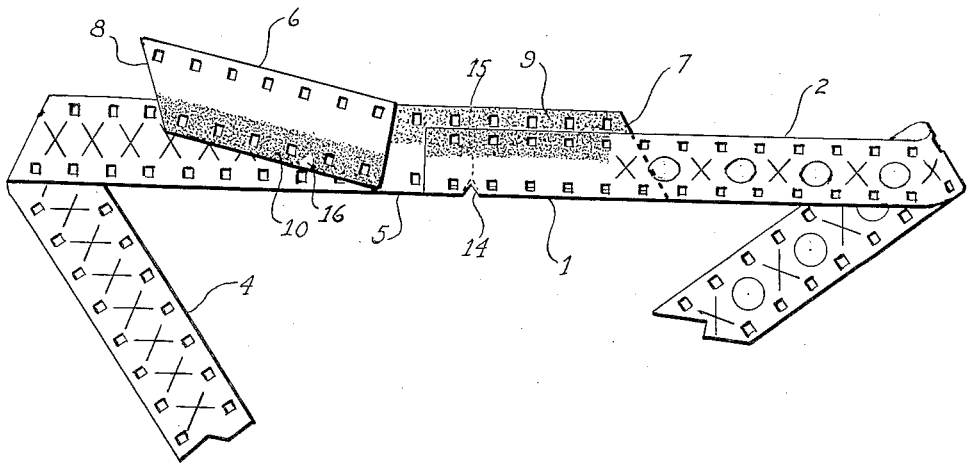

Further details of my invention and its construction and use are shown incorporated in the structures disclosed on the accompanying drawings, in which:

Fig. 1 shows the complete leader film with its split end open and ready to receive the beginning end of a movie film, Fig. 2 shows the split end portion of the leader film with its cut end cemented to the closing end of a movie film and with the split end temporarily united with the beginning end of a movie film, Fig. 3 shows the other end portion of the leader film with its cut end cemented to the beginning end of a movie film, and Fig. 4 shows the two ends of the leader film in alignment for temporary union.

The complete leader film as shown in Fig. 1 is treated at one end with pressure sensitive adhesive section 13 on less than half its width for a short length 1, has frames marked alternately with X and O for a length 2, has frames marked O for a length 3, has frames marked X for a length 4, and has an end split for a short length into two ends 5 and 6, with the end 5 cut diagonally as at 7 and the end 6 cut diagonally in the opposite direction as at 8. The inside surfaces of ends 5 and 6 are treated with pressure sensitive adhesive, each on less than half its width and on non-facing sections 9 and 10 so that, when the inside surfaces of ends 5 and 6 are pressed together, neither adhesive treated section touches the other. Also, the adhesive treated section on end length 1 is on that half of the surface which, when end 1 is put between ends 5 and 6, none of the adhesive treated sections touch each other. The adhesive treated sections 9 and 10 are on those surface halves which are cut short by the diagonal cuts 7 and 8 respectively; thus, when the ends 5 and 6, or the ends 5 and 6 with a length of film between, are held together by the adhesive treated sections 9 and 10, the pointed ends of diagonal cuts 7 and 8 are free from each other and from any film between them, making these pointed ends easy to take hold of whenever necessary. Also, ends 1 and 5 have thumb-nail notches 14 and 15 respectively as indicators for easy alignment of the sprocket holes in end 1 with the sprocket holes in end 5 when these two ends are to be temporarily and operatively joined as in Fig. 4. A comparable section 16 on end 6 is left untreated with pressure sensitive adhesive so that, when end 1 is in operative alignment and removably united with ends 5 and 6, there will be no uncovered adhesive treated surface exposed by thumb-nail notches 14 and 15.

For use, the leader film will usually be cut somewhere along length 2, with the cut end cemented to the closing end of a movie film 11, as in Fig. 2. As the leader film is drawn through the projector in operation, the alternate frames of X and O of length 2 show on the screen as a warning that, if the projector is stopped when the frames O of length 3 appear, the ends 5 and 6 will be in position to be united with the beginning of the next movie film 12 to be projected.

If the projector is not stopped while frames O of length 3 appear on the screen, then frames X of length 4 will appear to indicate that ends 5 and 6 have progressed through the projector to a distance making impossible the union of ends 5 and 6 with the movie film 12. It is to be noted that the ends 5 and 6 will pass through the projector without exposing the adhesive treated sections 9 and 10.

When the projector is stopped with the frames O of length 3 on the screen, the union of ends 5 and 6 with movie film 12 is made by, first, taking hold of the points of diagonal cuts 7 and 8 and separating end 5 from end 6, secondly, placing the beginning end of a movie film 12 on the inside surface of end 5, making certain that the sprocket holes are lined up together before pressing the end 6, beginning with the end of length 4 and progressing to the pointed end of diagonal cut 8, on movie film 12, thus automatically aligning end 6 with the movie film 12 and end 5, and completing the temporary union.

The projector is then started again so that the movie film 12 is led through and automatically threaded into the projector. When the movie film 12 is completely threaded into the projector, the projector is again stopped, this time for disuniting the leader film ends 5 and 6 from the movie film 12. The disuniting is done by taking hold of the points of diagonal cuts 7 and 8, and pulling the ends 5 and 6 free from movie film 12.

Although that portion of the leader film made up of end length 1 and a part of length 2 is not essential to the automatic threading of movie film 12, it has several distinct uses if its cut end is cemented to the beginning of movie film 12 as in Fig. 3. Firstly, it provides an indicator 14 to be used with a similar indicator 15 on end 5 as in Fig. 4 for making easy the alignment of the sprocket holes of each with the other. As the opened ends 5 and 6 are held in the left hand with the thumb nail in notch 15, the notched edge of end 1 is slid along the thumb nail until notch 14 catches in the thumb nail. The edges of end 1 are then brought into alignment with the edges of end 5 by holding these edges between the forefinger and thumb of the right hand, and thus, when end 1 is pressed down on end 5 for their temporary union, the sprocket holes of each are in alignment with those of the other. End 6 is then pressed on end 1 and is automatically in operating alignment with end 1 since it is aligned structurally with end 5. Secondly, when end 1 is in operative position between ends 5 and 6, the adhesive treated section 13 is in contact with an untreated surface, making the temporary union of ends 5 and 6 with end 1 more complete than the temporary union of ends 5 and 6 with movie film 12 in Fig. 2. Thirdly, as the union of ends 5 and 6 with end 1 passes through the projector and has passed the projection lens, the alternating frames X and O of that portion of length 2 show on the screen until the union of ends 5 and 6 with end 1 is completely through the projector and ready for disuniting. Fourthly, the adhesive treated section 13 of freed end 1 is then used to make fast the movie film 12 to the hub of the reel to which the movie film will be wound during projection, made fast either by adhering to the hub of the reel or to the second lap of film wound around the hub. And fifthly, the adhesive treated section 13 is used to make fast end 1 to the next to the last lap of the beginning end of movie film 12 after it has been rewound on a reel in preparation for its next showing.

I have shown a practical and efficient embodiment of the various features of my invention, and I do not desire to be limited to the exact construction, arrangement and operation shown and described as changes and modifications may be made without departing from the scope of the invention as outlined in the accompanying claims.

I claim as follows:

1. A leader for movie films to be cut into two sections for attachment of each cut end to separate film strips: one original end made up of two concurrent parts both treated with an adhesive on inside non-complementary sections; the other original end treated with an adhesive on a section non-complementary to the adhesive treated sections of said first original end when the said two original ends are in operative position; and said two original ends each having a notch, said notches being identical, having two edges of angular relationship, and being complementary to each other when said two original ends are in operative position.

2. A leader for movie films to be cut into two sections for attachment of each cut end to separate film strips: one original end made up of two concurrent parts both treated with an adhesive on inside non-complementary sections; and each original end having a notch, said notches being identical, having two edges of angular relationship, and being complementary to each other when said two original ends are in operative position.

HUGO R. HUSTAD.

REFERENCES CITED

The following references are of record in the file of this patent:

UNITED STATES PATENTS

| Number | Name | Date |
| --- | --- | --- |
| 1,065,135 | Ivatts | June 17, 1913 |
| 1,383,745 | Newman | July 5, 1921 |
| 1,450,795 | Dohe | Apr. 3, 1923 |
| 1,596,808 | Comstock | Aug. 17, 1926 |
| 1,598,445 | Howell | Aug. 31, 1926 |
| 1,655,297 | Thornton | Jan. 3, 1928 |
| 1,663,738 | Thornton | Mar. 27, 1928 |
| 2,207,657 | Chamberlin | July 9, 1940 |
| 2,253,874 | Tucker et al. | Aug. 26, 1941 |
| 2,438,063 | Risler | Mar. 16, 1948 |

FOREIGN PATENTS

| Number | Country | Date |
| --- | --- | --- |
| 738,412 | France | Oct. 12, 1932 |
| 855,178 | France | Feb. 5, 1940 |